United States Patent Office 3,836,551
Patented Sept. 17, 1974

3,836,551
METHOD FOR MAKING SALTS OF N-ACYLAMINO CARBOXYLIC ACIDS
Guenter Schroeder, Ober-Ramstadt, Wolfgang Gaenzler, Darmstadt, Peter Uddrich, Darmstadt-Eberstadt, and Josef Babuliak, Pfungstadt, Germany, assignors to Rohm Gesellschaft mit beschrankter Haftung
No Drawing. Filed Jan. 13, 1971, Ser. No. 106,255
Claims priority, application Germany, Jan. 30, 1970, P 20 04 099.7
Int. Cl. C09f 7/00
U.S. Cl. 260—404                8 Claims

ABSTRACT OF THE DISCLOSURE

Salts of N-acylamino carboxylic acids, useful as intermediates or as surface-active agents, are made by reacting an amino acid and a carboxylic acid, ester, or amide at 100° C.–250° C. in the presence of a salt-forming basic compound such as an alkali metal or alkaline earth metal hydroxide, a tertiary amine, or a quaternary ammonium hydroxide.

---

The present invention relates to the preparation of salts of N-acylamino carboxylic acids.

N-acylamino carboxylic acids have technical significance as intermediate products or, if they contain hydrophobic acid radicals, as surface-active agents. Heretofore, they have been obtainable from the corresponding amino acids only by reaction thereof with high-active acylating agents, principally acid chlorides or acid anhydrides, as discussed for example in German patent publication 1,543,634. In this reaction, the amino acids are usually employed in the form of their metallic salts. The use of acylating agents of this type makes the acylamino expensive, so that their use has remained very narrowly limited.

It is known, to be sure, that amines can be converted by direct reaction with carboxylic acids, carboxylic acid esters, or carboxylic acid amides at high temperatures to form the corresponding substituted amides. However, this acylation method has heretofore not been applied to the preparation of N-acylamino acids. Only formic acid, if employed in great excess, forms N-formylamino acids on repeated evaporation in the presence of the free amino acid. Other carboxylic acids, as well as their esters or amides, react practically not at all with amino acids. This may possibly be attributed to the amphoteric character of these acids.

It has now been discovered that, surprisingly, amino acids having at least three carbon atoms can be acylated on the nitrogen atom in good yield by reaction with a carboxylic acid, an ester thereof, or an amide thereof, at temperatures of from 100° C. to 250° C., if the reaction is carried out in the presence of an equivalent amount of a basic compound forming salts with carboxylic acids. The reaction product formed is the salt of the N-acylamino acid with the basic compound. The mechanism of the reaction is not known in detail, however, it is possible that the critical step is the conversion of the carboxyl group of the amino acid into a carboxylate group. It has proved to make no difference to the course of the reaction whether the basic compound is added as such or in the form of a salt after previous reaction with either the carboxylic acid used as the acylating agent or after previous reaction with the amino acid.

The technical advantage of the new process lies, on the one hand, in the fact that the free carboxylic acids or their salts, esters, or amides used as acylating agents are in most cases significantly cheaper than the corresponding acid chlorides or acid anhydrides. On the other hand, there is the further advantage that only water, an alcohol, ammonia, or an amine are formed in the condensation reaction, all of which can be removed in gaseous form. In prior art acylation processes, sodium chloride or carboxylic acid salts are formed as by-products.

Among the amino acids, only glycine has proved to be not useful in the process of the invention, since significant resin formation occurs and no uniform compounds can be isolated from the reaction product. There is reason to believe that N-acylation occurs also when glycine is used, but that a very heterogeneous mixture of substances is subsequently formed by side reactions and further reactions. Separation of the complex mixture produced has not yet been possible. Those homologs of glycine containing one more carbon atom, namely alanine, β-alanine, or sarcosine, can be readily acylated according to the present invention. In those amino acids having at least three carbon atoms which are adaptable to use in the method of the present invention, not all of the carbon atoms need be in a straight chain, as is evident from the applicability of the process to sarcosine.

Amino acids having at least three carbon atoms can be used in the process of the present invention without any limitation in principle, although not all of the acids react equally readily. Not only can natural α-amino acids be reacted, but also oligopeptides and amino acids having a number of carbon atoms between the amino group and the carboxy group, for example β-alanine, ε-aminocaproic acid, or anthranilic acid. As the molecular weight of the amino acid increases, reaction occurs less readily, so that those acids having from 3 to 10 carbon atoms are generally preferred. Also, the aliphatic amino acids react more readily than do the aromatic, and are preferred for this reason. Good yields are obtained, for example, with valine, leucine, norleucine, alanine, β-alanine, and sarcosine. However, the reaction proceeds also with materials such as phenyl glycine, phenyl alanine, 1-amino cyclohexane carboxylic acid-1, α-amino isobutyric acid, and with other α-amino acids.

According to the invention, a carboxylic acid, a carboxylic acid ester, or a carboxylic acid amide are employed as the acylating agent. Reactivity decreases from the acids to the esters to the amides. Among the esters, those of the lower alkanols, i.e. those of alkanols having 1–4 carbon atoms, above all the methyl esters, are the most reactive and are preferred in the process of the invention. The lower esters further have the advantage that the alcohols cleaved during the course of the reaction volatilize and can be removed in the vapor phase. Further, the danger of thermal cleavage of these esters into an olefin and a carboxylic acid is smaller.

A similar dependence of reactivity on the number and size of the substituents is true for the amides; amides which are unsubstituted on the nitrogen atoms react more readily than do N-mono-substituted or N-di-substituted amides. In the acylation of sterically hindered or temperature sensitive amino acids with acylating agents of reduced activity, a proportionally lower yield will be obtained. For this reason, the least reactive acylating agents are preferably used on those amino acids which are particularly readily acylated, such as valine or leucine.

The preferred acylating agents according to the process of the invention are carboxylic acids or their salts with the basic compounds used according to the present invention. As examples of suitable carboxylic acids can be mentioned the aliphatic saturated mono- and di-carboxylic acids such as acetic acid, propionic acid, capric acid, lauric acid, myristic acid, stearic acid, behenic acid, succinic acid, and adipic acid, as well as unsaturated mono- and di-carboxylic acids such as acrylic acid, methacrylic acid, crotonic acid, oleic acid, linoleic acid, maleic acid, or itaconic acid. Aromatic mono- and di-carboxylic acids such as benzoic acid, phthalic acid, or terephthalic acid are also suitable, as are, finally, polycarboxylic acids such as polymethacrylic acid. Saturated aliphatic carboxylic acids, particularly those having from 8 to 22 carbon atoms, and unsaturated carboxylic acids are preferably employed.

As the basic compound, all those substances can be used which convert the carboxyl group of the amino acid or of the carboxylic acid into a carboxylate group.

Basic compounds which cannot be acylated produce fewer side reactions and are thus preferred because of the smoother course of the reaction. Such compounds include, on the one hand, basic metal compounds, and, on the other hand, all organic nitrogen compounds which do not have a reactive hydrogen atom. To the extent that organic nitrogen bases can be acylated on the nitrogen atom, they compete with the amino group of the amino acid, i.e. they can be converted to the corresponding carbonamides which then serve in turn as acylating agents.

Inorganic basic compounds are generally preferred. Among them, the alkali metal and alkaline earth metal hydroxides and carbonates are especially suitable. In practice, sodium hydroxide is predominantly employed, since it gives a high yield and is cheap. In special cases, it can be of advantage to use other basic metal compounds, for example the hydroxides, carbonates, or basic salts of aluminum, zinc, cadmium, or lead, in order to produce specific properties. Ammonia can also be employed.

Suitable organic basic compounds are the tertiary amines or the quaternary ammonium bases. The latter have the advantage that they are not volatile. When tertiary amines are employed, suitable procedural measures should be taken so they do not escape from the reaction mixture in vapor form. For example, the reaction can take place in a closed reaction vessel. However, this has the disadvantage that the separation of the water, alcohol, or ammonia formed by the condensation reaction at an acceptable technical cost is difficult. It is more advantageous to employ a tertiary amine which has a boiling point above the reaction temperature.

For this purpose, tributyl amine, tribenzyl amine, triethanolamine, diethanolmethylamine, or dimethylaniline can be employed, for example.

The basic compound does not have to be added *per se* to the reaction mixture, but can be added either in the form of a salt with the amino acid or in the form of a salt with the carboxylic acid employed as the acylating agent. Advantageous use of these possibilities can be made, for example, if the amino acid or the carboxylic acid acylating agent is more readily available in the form of a salt than in the form of a free acid. Salts of the acylating agent are also advantageously used if the reaction is carried out at a temperature above the boiling point of the free carboxylic acid.

The amino acid, the acylating agent, and the basic compound are as a rule used in equivalent amounts. However, it can be advantageous in certain cases to use one or more of the starting materials in excess. An excess of the basic compound is only seldom necessary; in contrast, an excess of the acylating agent up to 10 times the equivalent amount of amino acid can be used to improve the yield. Any greater excess generally shows no further influence. However, in certain cases it might be desired to have a mixed reaction product comprising, for example, an amino acid salt acylated with a long-chain carboxylic acid in admixture with an alkali soap. Such mixtures have very advantageous surface-active properties. Such a mixture can be obtained in a simple manner by the reaction of an excess of the alkali soap with an amino acid. In a case such as this, the proportion of the reaction partners in the mixture is determined by the desired product composition.

The reaction of the invention is generally carried out in a molten fluid phase, without addition of a solvent. This procedure is particularly preferably employed when the reaction mixture contains basic metal compounds for which few non-aqueous solvents (e.g. dimethyl formamide or dimethyl sulfoxide) are available. Also, the amino acids in many cases are not soluble in organic solvents free of water. Nevertheless, in such cases the reaction can also be carried out in a suspension of the amino acid in a solution of the acylating agent and the organic basic nitrogen compound in an organic solvent. For this purpose, water-immiscible solvents of high boiling point are advantageously employed, for example xylene or higher gasoline fractions, and the water of reaction is removed from the boiling reaction mixture by azeotropic distillation. The reaction temperature is between about 100° C. and about 250° C., preferably between about 160° C. and 200° C. For many of the reactions falling within the scope of the present invention, the most suitable reaction temperature is between about 180° C. and 200° C. The reaction can take place either in an open vessel or enclosed apparatus under the autogenous pressures produced at these temperatures.

The product of the reaction permits the achievement of yields of more than 90 percent of theory, with suitable choice of reagents and of reaction conditions. Working up and purification of the product take place according to conventional methods. For example, free acylamino acid can be liberated from its salt in the reaction product by the addition of mineral acid, and can then be obtained in pure form by further conventional methods such as by extraction of the aqueous acid solution with a water-immiscible organic solvent.

Alkali salts of acylamino carboxylic acids formed according to the process of the present invention with a long-chain acid residue are useful surface-active agents of the type described, for example, in German Pat. 1,262,216. For this purpose, it is possible to use the crude reaction product directly.

By cleavage of water, $\alpha$-(acylamino)-carboxylic acids can be converted to oxazolones (azlactones) according to the following reaction scheme:

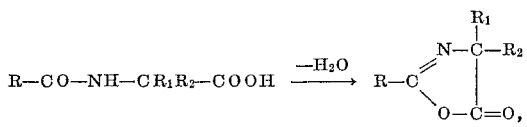

$$R-CO-NH-CR_1R_2-COOH \xrightarrow{-H_2O} R-C\begin{array}{c}N-C-R_2 \\ | \\ O-C=O,\end{array}$$

in which $R_1$ and $R_2$ are the same or different organic radicals or are hydrogen. This reaction proceeds, for example, by heating with acetic anhydride. The oxazolones add compounds having a reactive hydrogen atom with ring opening and can therefore be reacted in manifold ways. For example, British Pat. 1,121,418 describes the copolymerization of those oxazolones which, as the radical R, have a polymerizable $\alpha,\beta$-unsaturated group. The copolymers can be cross-linked through the oxazolone groups.

A better understanding of the present invention and of its many advantages will be had by referring to the following specific Examples, given by way of illustration.

In all of the following Examples reported in Table I, the following general procedure is employed:

Equivalent amounts of the reagents are mixed, melted, and heated to 200° C. in a reaction vessel having a reflux condenser and warmed with an oil bath. The reaction is carried out under a nitrogen atmosphere in order to avoid darkening of the reaction mixture. In general, a weak evolution of $CO_2$ of the order of magnitude of 1–3 mol percent (per equivalent of the reaction mixture) is observed during the reaction. The reaction times employed are given in the Table below.

The cooled reaction mixture is then worked up according to different methods:

(A) The reaction mixture formed by the reaction of an amino acid, a fatty acid, and a base is dissolved in water, filtered to remove insoluble portions, and acidified with hydrochloric acid. The acylamino acid, which may be mixed with non-reacted fatty acid, precipitates. This mixture is as a rule usable as a surface-active agent without further separation after neutralization.

(B) The crude product obtained by the reaction of an alkali salt of the amino acid and a fatty acid is treated with hot dimethyl formamide and the solution is optionally filtered while hot. On cooling, the salt of the fatty acid crystallizes first. By reduction of volume in vacuum, the acylated amino acid is obtained from the filtrate in a high degree of purity.

(C) The crude product formed from an alkali salt of the amino acid and a fatty acid ester is first freed of any residual ester by distillation in vacuum and is then further processed according to (B) above.

(D) The crude product obtained by the reaction of an alkali salt of an amino acid with a fatty acid amide is first treated with a water-alcohol mixture, whereby unreacted fatty acid amide remains undissolved and is removed by filtration. The filtrate is evaporated to dryness in a rotating evaporator, the residue is dissolved in hot dimethyl formamide, and difficultly soluble by-products such as alkali salts of the fatty acids are separated on cooling. By evaporation in a vacuum using a rotating evaporator, the desired acylamino acid is obtained in a highly purified form.

To the extent that the yield is not determinable from processing procedures (A)–(D) as indicated above, it has been determined by quantitative thin layer chromatography (method E) or by determination of the degree of reaction of the basic group of the amino acid by means of titration with perchloric acid (method F).

What is claimed is:
1. In a method for making a salt of an N-acylamino carboxylic acid which comprises reacting an aliphatic hydrocarbon amino acid having from 3–10 carbon atoms with an aliphatic saturated or olefinically unsaturated mono- or di-carboxylic acid having 8–22 carbon atoms, or with a lower alkyl ester or an amide of such an acid, the improvement which comprises reacting said amino acid and said carboxylic acid, ester, or amide, in a solvent-free molten fluid phase at a temperature from about 100° C. to about 250° C. in the presence of a basic metal hydroxide or carbonate forming carboxylic acid salts, said acid, ester, or amide and said basic metal hydroxide or carbonate being present in an equivalent ratio from 1:1 to 10:1 with respect to said amino acid.

2. A method as in Claim 1 wherein a salt is first formed between said amino acid and said basic compound, and said salt is then reacted with said carboxylic acid, ester, or amide.

3. A method as in Claim 1 wherein said amino acid is valine, leucine, norleucine, alanine, β-alanine, or sarcosine.

4. A method as in Claim 1 wherein said basic compound is an alkali metal hydroxide or alkaline earth metal hydroxide.

5. A method as in Claim 1 wherein said reaction proceeds under autogenous pressure.

6. A method as in Claim 1 wherein said amino acid is reacted with a carboxylic acid.

7. A method as in Claim 6 wherein a salt is first formed between said carboxylic acid and said basic compound and said salt is then reacted with said amino acid.

8. A method as in Claim 6 wherein said carboxylic acid is unsaturated.

TABLE I

| Example No. | Amino acid (or its salt, or basic additive) | Acylating agent (or its salt) | Reaction time (hours) | Yield (in percent of theory) | Processing or yield determination |
|---|---|---|---|---|---|
| 1 | Valine, Na-salt | Myristic acid | 9 | 90 | A |
| 2 | Valine | Myristic acid, Na-salt | 9 | 90 | A |
| 3 | Valine plus NaOH | Myristic acid | 9 | 90 | A |
| 4 | Valine, Na-salt | Oleic acid | 9 | 85 | B |
| 5 | Valine | Na-formate | 3 | 57 | E |
| 6 | Valine, Na-salt | Propionic acid | 17 | 58 | E |
| 7 | do | Benzoic acid | 17 | 11 | E |
| 8 | α-Amino-isobutyric acid, Na-salt | Myristic acid | 9 | 30 | E |
| 9 | Phenyl glycine, Na-salt | do | 15 | 22 | E |
| 10 | Sarcosine, Na-salt | do | 8 | 55 | E |
| 11 | β-Alanine, Na-salt | do | 14 | 63 | F |
| 12 | ε-Amino-caproic acid, Na-salt | do | 8 | 59 | F |
| 13 | Valine, K-salt | do | 16 | 74 | A |
| 14 | Valine, Mg-salt | Stearic acid | 8 | 74 | F |
| 15 | Valine, Al-salt | do | 8 | 70 | F |
| 16 | Valine, Pb-salt | do | 8 | 80 | F |
| 17 | Valine, NH₄-salt | Myristic acid | 3 | 40 | F |
| 18 | Valine plus trimethylamine | do | 8 | 50 | E |
| 19 | Valine plus tetramethyl ammonium hydroxide | do | 5 | 25 | E |
| 20 | Valine, Na-salt | Myristic acid amide | 60 | 60 | D |
| 21 | do | Palmitic acid amide | 48 | 51 | D |
| 22 | Leucine, Na-salt | Myristic acid methyl ester | 30 | 57 | C |
| 23 | Norleucine, Na-salt | do | 30 | 53 | C |
| 24 | Alanine, K-salt | do | 30 | 56 | C |
| 25 | Valine, Na-salt | Lauric acid methyl ester | 30 | 53 | C |

References Cited

UNITED STATES PATENTS

| | | | |
|---|---|---|---|
| 2,729,657 | 1/1956 | Krems | 260—404 |
| 3,074,980 | 1/1963 | Lorentzen | 260—404 |
| 3,590,057 | 6/1971 | Suzuki et al. | 260—404 |
| 3,427,316 | 2/1969 | Wakeman et al. | 260—404 |
| 3,272,851 | 9/1966 | Sunde et al. | 260—404 |

FOREIGN PATENTS

| | | | |
|---|---|---|---|
| 1,197,672 | 7/1970 | Great Britain | 260—404 |

GLENNON H. HOLLRAH, Primary Examiner

U.S. Cl. X.R.

260—307 C, 435 R, 448 R, 518 R, 534 R, 534 C